June 3, 1941.    D. B. BANKS    2,244,599
CATALYTIC CONVERTER
Filed June 28, 1940    2 Sheets-Sheet 1

WITNESS:
Rob't R. Mitchel.

INVENTOR
Daniel B. Banks
BY
Busser and Harding
ATTORNEYS.

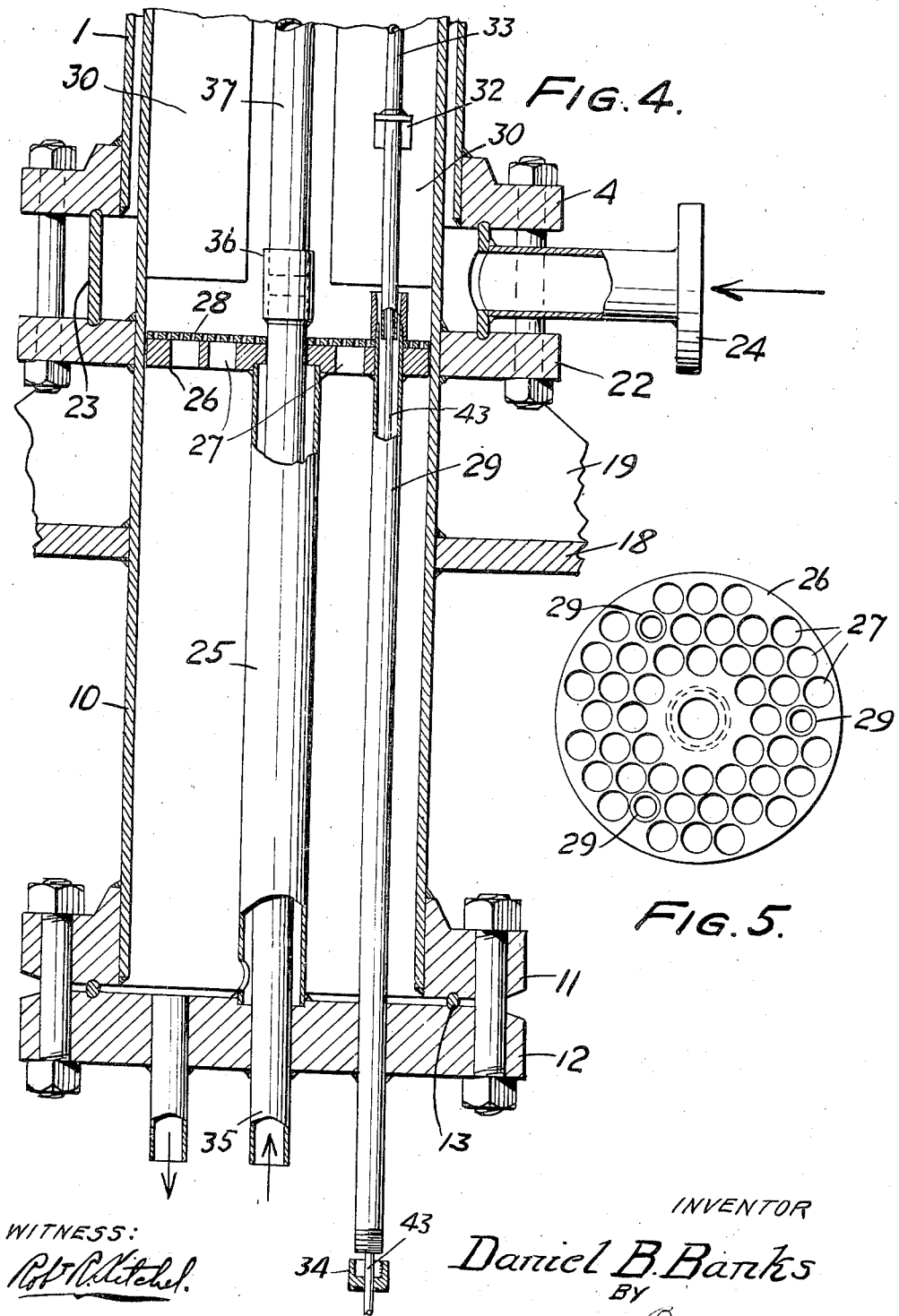

Patented June 3, 1941

2,244,599

UNITED STATES PATENT OFFICE 2,244,599

CATALYTIC CONVERTER

Daniel B. Banks, Drexel Hill, Pa., assignor to Sun Oil Company, Philadelphia, Pa., a corporation of New Jersey Application June 28, 1940, Serial No. 342,859

6 Claims. (Cl. 23—288)

The present invention relates to catalytic converters and particularly to that type of catalytic converter which is alternately on stream and in regeneration.

In the transformation of hydrocarbons, either treating, cracking, polymerization or hydrogenation, and in other common chemical reactions, the catalyst used, regardless of the type, very often becomes contaminated by the reaction carried on and must therefore be regenerated either by oxidation or by chemical treatment. The reaction during the on-stream period may, in the case of cracking, be an endothermic reaction, or, as in the case of polymerization, may be an exothermic one. Certain other purely chemical reactions may also be endothermic or exothermic. Likewise, the regeneration operation may be of either type, although most generally it is an exothermic reaction such as the oxidation of contaminants which are deposited on the catalyst during the on-stream period.

In view of these conditions, particularly where the on-stream reaction is endothermic and the reaction is carried out at a comparatively low temperature, say 300–400° F., and the regeneration reaction is exothermic and is carried on in the neighborhood of 1000° F., considerable strains are very often set up in the apparatus due to expansion and contraction when changing from the on-stream to the regeneration operation and vice versa. It is therefore necessary to provide converters which are capable of withstanding such strains and at the same time have provision for the circulation of heat exchange medium for supplying heat during an endothermic reaction or removing heat during an exothermic reaction.

The present invention has for its object the provision of a catalytic converter which is adapted to be used in cases where extreme temperature changes are encountered during the cycle of operations and also one which provides for the removal of heat therefrom or the addition of heat thereto during the cycle of reaction.

A further object is to provide a converter which may be readily disassembled for removal and change of catalyst, or for cleaning the same.

Other and further objects will appear as the description of the accompanying drawings progresses.

In the drawings:

Fig. 4 shows a sectional view taken through the lower portion of Fig. 1; and

Fig. 5 shows a plan view of the main support for the catalyst.

Figures 1, 2:
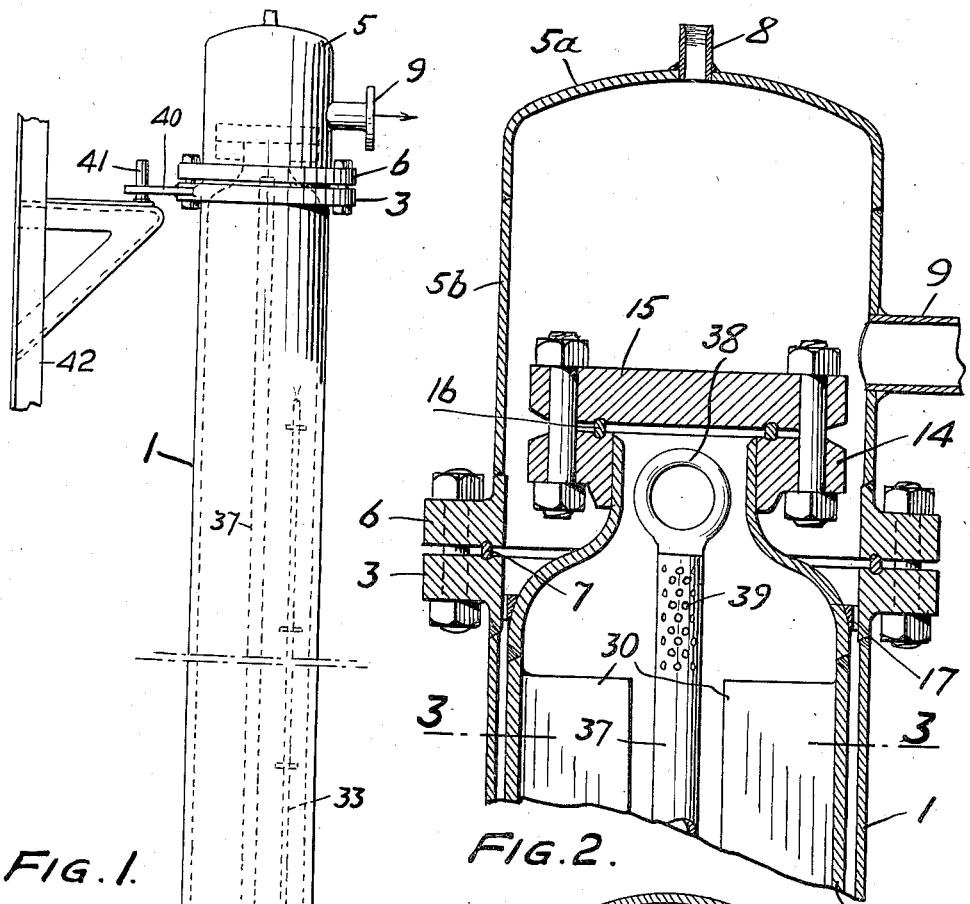
Fig. 1 shows a side elevation of a catalytic converter.
Fig. 2 shows a sectional elevation of the upper portion thereof.

The converter comprises an outer shell enclosing the upper portion thereof and an inner shell contained within the outer shell and extending therebelow, the entire converter structure being mainly supported by the inner shell, as hereinafter described. The outer shell consists of a length of large diameter tubing 1, having welded thereto at its upper and lower ends flanges 3 and 4 respectively. The upper portion of the outer casing consists of a dome-shaped member 5, made up of a dished head 5a and a section of casing 5b of the same diameter preferably as the casing 1, the lower end of the upper portion 5 having welded thereto a flange 6, flanges 6 and 3 being bolted together and being made liquid and gas tight by means of seal ring 7 held between the flanges. The top of the cover member 5 is provided with a connection 8, to which a pressure relief valve or other safety valve may be attached, as well as with an outlet nozzle 9 through which heat exchange medium flows from the casing.

The inner member of the apparatus comprises a length of casing 10, smaller in diameter than the outer casing 1, so as to provide an annular space for the flow of heat exchange medium therebetween. The bottom of the inner casing 10 has welded thereto a flange 11, cooperating with a blank 12, the two being bolted together and forming a tight joint by means of seal ring 13. The upper end of the inner casing 10 is of smaller diameter than the main body thereof and has welded thereto a flange 14 cooperating with a blank 15, the two being bolted together and forming with seal ring 16 a liquid and gas tight joint. Near the upper portion of inner casing 10 there is welded thereto a ring 17 which spaces the inner casing 10 from the outer casing 1, the ring 17 being provided with grooves on its outer face to permit the flow of heat exchange medium.

Casing 10 has welded thereto at the lower part thereof a plate 18 and angles 19 to form a support for the entire apparatus, the plate 18 resting on I-beams 20 and 21. Immediately above the plate 18 there is welded to the inner casing 10 a flange 22. Between the flange 22 and the flange 4 on the outer casing there is placed a ring 23 of larger diameter than the outer casing 1, the ring 23 being provided with a nozzle 24 for the admission of heat exchange fluid. It will be readily understood from the drawings that when the ring 23 is placed between the flanges 4 and 22 and the bolts pulled home, a liquid and gas tight joint will be formed. The space between the ring 23 and the inner casing 10 forms an annular distribution chamber for the heat exchange medium admitted through nozzle 24.

The lower blank 12 on the inner casing has welded thereto a tube 25 which supports at its upper end a plate 26 having large perforations 27 therein, plate 26 being freely movable within the inner casing 10. Resting upon plate 26 is a thinner plate 28 having small perforations therein. The plates 26 and 28 are further supported by three tubes 29 which pass through and are welded to both plates 26 and 28, as well as the blank 12.

Figure 3:
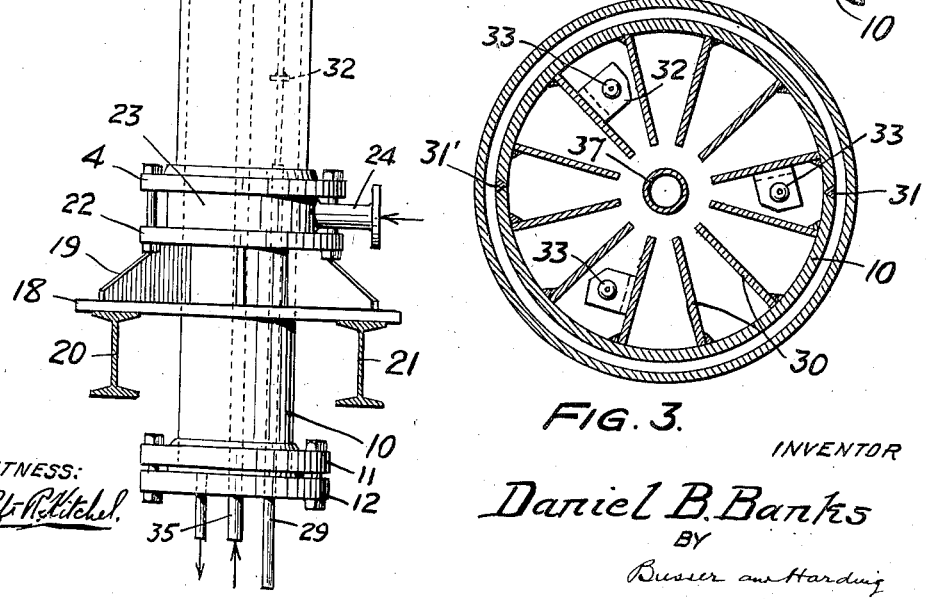
Fig. 3 shows a cross section taken on line 3—3 of Fig. 2.

Within the inner casing 10 there is positioned a multiplicity of ribs 30 which are welded along their entire line of contact with the inner casing 10. Since in most cases the inner casing 10 would be too small to permit machine welding of these ribs as one piece, the inner casing 10 is usually cut in two and re-welded as indicated at 31, 31', Fig. 3.

To three or more of the ribs 30 there are welded ears 32 having perforations therein. Slidably mounted within all of the ears except the lowermost, and welded to the latter, are thermocouple casings 33 which are tightly closed at their upper ends. The thermocouple cases are not all of the same length, but are of such lengths as to give temperature indications at various positions throughout the catalyst mass. The thermocouple casings 33 are welded only to the lowermost ears 32 as indicated in Fig. 4, so that they may expand and contract due to temperature changes without twisting or bending. The lower ends of the thermocouple wells 33 extend into and slidably fit in tubes 29, which partially support plates 26 and 28. Into tubes 29 are inserted the small diameter tubes 43 which carry the thermocouple wires. These tubes are mounted in couplings 34 which engage the lower ends of tubes 29 and thereby effectively seal the same against egress of gases or liquid.

A small tube 35 extends through blank 12, tube 25 and plates 26 and 28. Tube 35 is welded so as to make an air and gas tight joint where it passes through the blank 12. Its upper end is provided with a coupling 36 which is threaded thereon and welded as indicated in Fig. 4, so that the same may not be turned to unscrew it. Threaded into the upper end of coupling 36 is a tube 37 which extends to near the top of the inner casing 10. The top thereof is closed by a plug 38, having a ring thereon and is perforated as at 39 to permit the passage of fluid therefrom.

The upper portion of the structure is guided or steadied by a member 40 which is slidably mounted on a pin 41 supported on structure work 42, so that as casing 1 expands or contracts, due to the temperature changes, the member 40 will slide on pin 41.

In assembling the structure the inner casing is first placed upon the I-beams 20 and 21 and bolted or welded thereto. The ring member 23 is then slipped over the inner casing 10 and seated in the groove in flange 22. The outer casing 1 is then placed over the inner casing 10 and the groove in flange 4 aligned with the ring member 23, after which the bolts connecting flanges 4 and 22 are drawn home. When the outer casing is placed over the inner casing the hole in member 40 slips over the pin 41 and the flange 4 is seated in the ring member 23.

The next step is to insert the plates 26 and 28, together with the tubes 25 and 29 welded thereto, in the lower end of the inner casing 10, after which the bolts joining flange 11 and plate 12 are drawn home. The tube 37 may then be lowered into the upper portion of the inner casing 10 and screwed home in coupling 36. The catalyst may then be inserted in the inner chamber 10 through the opening to be closed by the blank 15 on the upper end thereof. After the inner casing 10 is filled with the catalyst, the blank 15 is bolted in place and the cover member 5 is also bolted to flange 3 on the outer casing. The thermocouple wells 33 are then placed in position and the couplings 34 screwed home on the lower ends of the tubes 29, after which the case may be put into operation to carry out the reactions intended.

It may be that in some cases a single catalytic chamber as shown will be all that is required for the reaction. However, where large quantities of fluids are reacted, a number of such cases may be placed so that flow therethrough, either of reactants or heat exchange medium, may be carried out either in series or in parallel.

What I claim and desire to protect by Letters Patent is:

1. An apparatus of the class described, comprising an inner catalyst chamber and removable upper and lower heads therefor, an outer chamber and a removable upper head therefor, a flange on the lower end of the outer chamber, a flange on the inner chamber, a ring between said flanges closing the lower end of the outer chamber and forming between the inner and outer chambers an annular space, a catalyst support, and means carried by the lower head of the inner chamber supporting the catalyst support at a level approximately that of the lower end of said annular space between the two chambers, whereby all portions of the inner catalyst chamber above such catalyst support will be in heat exchange relationship with the annular space between the inner and outer chambers.

2. An apparatus of the class described, comprising an inner catalyst chamber, a support therefor, closure members removably secured to its upper and lower ends, an outer chamber adapted to be lowered over the catalyst chamber and spaced therefrom to form an annular space between the two chambers, a flange welded to the lower end of the outer chamber, a flange welded to the inner chamber below and spaced from the other flange, a ring of larger diameter than said outer chamber and adapted to cooperate with said flanges to form a liquid-tight joint between the two, a tubular member welded to the lower closure member for the catalyst chamber, a catalyst support on the upper end of said tubular member, a tube for fluid passage extending through said tubular member and the lower closure member of the catalyst chamber, and a tube within said catalyst chamber communicating with the first named tube and extending to the upper end of said catalyst chamber.

3. A catalytic converter comprising an outer shell, an inner shell spaced from the outer shell and extending below it, closures for both ends of the inner shell, means supporting the inner shell, a support for catalytic material above the lower of said closures, tubular means supporting from the lower closure said support for catalytic material, and means supporting from the inner shell the outer shell, said supporting means forming a distribution chamber for a heat exchange medium communicating with the annular space between the two shells.

4. A catalytic converter comprising an outer shell, an inner shell spaced from the outer shell and extending below it, closures for both ends of the inner shell, means supporting the inner shell, a support for catalytic material above the lower of said closures, a tube the lower end of which is welded to the lower of said closures and the upper end of which is welded to and supports the said support for catalytic material, a tube welded to the lower of said closures and extending through the same, through the first named tube and through said support for catalytic material, a coupling on the upper end of the last named tube, and a tube extending upward from said coupling and terminating near the upper end of the inner shell and there provided with perforations.

5. A catalytic converter comprising an outer shell, an inner shell spaced from the outer shell and extending below it, closures for both ends of the inner shell, means supporting the inner shell, a support for catalytic material above the lower of said closures, a tube the lower end of which is welded to the lower of said closures and the upper end of which is welded to and supports the said support for catalytic material, a tube welded to the lower of said closures and extending through the same, through the first named tube and through said support for catalytic material, a coupling on the upper end of the last named tube, a tube extending upward from said coupling and terminating near the upper end of the inner shell and there provided with perforations, and means engaging the lower end of and supporting the outer shell and supported from the inner shell and forming a distribution chamber for a heat exchange medium communicating with the annular space between the two shells.

6. A catalytic converter comprising an inner shell and supporting means therefor, removable heads closing the upper and lower ends of said shell, a support for catalytic material slidable within the inner shell above its lower end, means extending longitudinally within the lower part of the inner shell and welded to both the lower removable head and the support for catalytic material, whereby the latter is supported, a tube for fluid passage extending longitudinally within the lower part of the inner shell and also through the lower head and said support for catalytic material and welded to both, another tube for fluid passage within the inner chamber above the support for catalytic material and removably secured to the first named tube; the lower removable inner head shell, the means for supporting the catalytic material and the first named tube being thereby removable, as a unit from the inner shell; an outer shell concentric with and spaced from the inner shell, means supporting the outer shell from the inner shell and closing the lower end of the outer shell, and means removably securing together the two shells.

DANIEL B. BANKS.